United States Patent
Haglid

(10) Patent No.: US 7,497,247 B2
(45) Date of Patent: *Mar. 3, 2009

(54) HEAT EXCHANGER

(75) Inventor: Klas C. Haglid, Wyckoff, NJ (US)

(73) Assignee: Klas C. Haglid, Building Performance Equipment, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/321,237

(22) Filed: Dec. 29, 2005

(65) Prior Publication Data

US 2006/0151149 A1 Jul. 13, 2006

Related U.S. Application Data

(62) Division of application No. 09/829,772, filed on Apr. 10, 2001, now Pat. No. 6,983,788.

(51) Int. Cl.
*F28D 9/00* (2006.01)
*F24F 5/00* (2006.01)
*F24F 7/007* (2006.01)
*F24F 7/08* (2006.01)

(52) U.S. Cl. .......... 165/54; 165/166; 165/905; 165/909; 156/308.4; 156/309.6; 156/196; 264/248

(58) Field of Classification Search .......... 165/54, 165/166, 167, 909, 905; 156/308.4, 309.6, 156/196; 264/248
See application file for complete search history.

(56) References Cited

U.S. PATENT DOCUMENTS 4,820,468 A * 4/1989 Hartig .......... 264/163
5,474,639 A * 12/1995 Alander et al. .......... 156/309.6
6,660,198 B1 * 12/2003 Fischer .......... 264/138

FOREIGN PATENT DOCUMENTS

EP 10817 A1 * 5/1980
WO WO 9533173 A1 * 12/1995

* cited by examiner

*Primary Examiner*—John K Ford
(74) *Attorney, Agent, or Firm*—BPE

(57) ABSTRACT

The heat exchanger is made economically by using thermoplastic sheets with hollow tubes and spacers between the sheets and fusing the edges of the sheets together to form an integral housing. Preferably, the heat exchanger is an opposed-flow heat-exchanger giving improved heat-transfer efficiency.

11 Claims, 4 Drawing Sheets

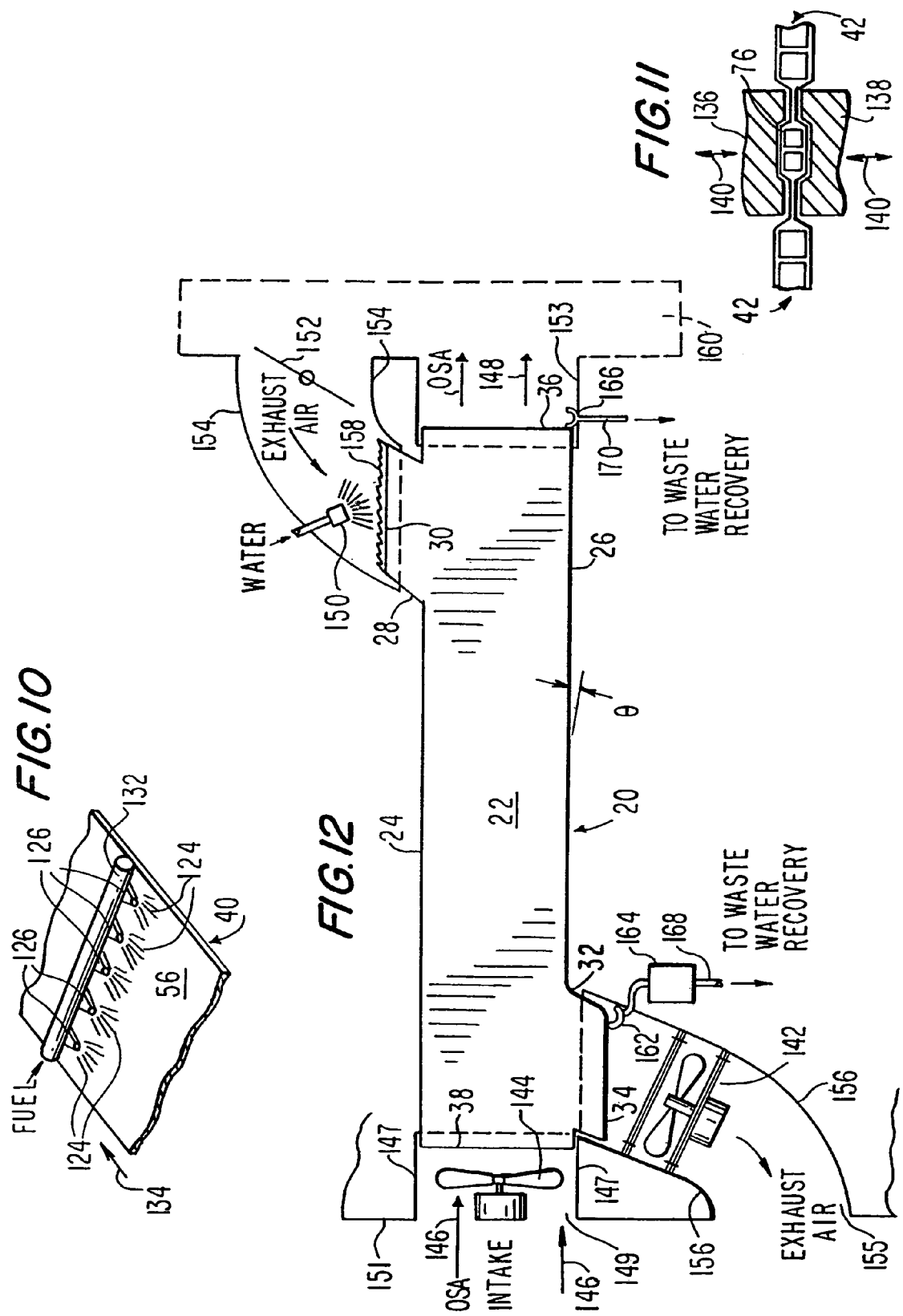

HEAT EXCHANGER

This patent application is a division of patent application Ser. No. 09/829,772, filed Apr. 10, 2001 now U.S. Pat. No. 6,983,788.

This invention relates to ventilating systems and methods using heat-exchangers for energy recovery, and to heat exchangers, especially exchangers suitable for use in such systems, and to methods for fabricating heat exchangers.

The ventilating systems of the above-identified patent applications represent significant improvements over prior ventilating systems. Nonetheless, further improvements are desirable, and it is an object of this invention to provide them.

One embodiment of the ventilating system of the above patent applications uses evaporative cooling to cool exhaust air exiting a building or other conditioned space. Although the evaporative cooling feature significantly enhances the efficiency of cooling the conditioned space, even greater cooling is highly desirable, as long as power and equipment costs are not increased excessively.

Prior energy-recovery ventilating systems and others using isolating heat-exchangers, that is, heat-exchangers which isolate the gas flows from one another, often suffer from the effects of leakage in the heat exchanger. This leakage causes undesired mixing of the two gases from one another. In a ventilating system, this can mean that the stale exhaust air mixes with the incoming fresh air, and leads to reduced air quality and even contamination of the incoming fresh air.

A third problem occurs with the preferred heat exchanger used in my above-described prior system. That heat-exchanger is made out of extruded thermoplastic panels composed of side-by-side plastic tubes. The heat-exchanger is admirably suited to use with evaporative cooling equipment because mold and other such nemeses do not adhere strongly to the heat-exchanger surfaces, and can be removed relatively easily. Also, the heat-exchanger is relatively inexpensive to build and lasts much longer than most metallic heat-exchangers.

A problem with such heat-exchangers is that most are relatively less efficient in the transfer of heat than they could be.

Another problem is that such prior heat-exchangers usually require relatively expensive housings, often made of sheet-metal.

A further problem is that such prior heat-exchangers usually are assembled using hand labor, and thus are more time-consuming and expensive to make than they need be.

In accordance with the present invention, the foregoing problems are solved or alleviated by the provisions of a ventilating system and method which includes evaporative cooling of the exhaust air before it enters a heat exchanger to cool incoming fresh outside air. A suction fan pulls exhaust air through the heat exchanger and, in combination with a flow restrictor, reduces the pressure on the exhaust air and augments the evaporative cooling.

Preferably, another fan is used to push outside air through the heat-exchanger and into the conditioned space.

The use of a pusher fan to force outside air through the heat exchanger ensures that any leakage in the heat-exchanger results in outside air entering exhaust air and minimizing the chances of contamination by leaking exhaust air into the incoming fresh air.

The heat exchanger is made economically by die-forming cavities in relatively thick thermo-plastic sheets, interleaving them with other thermo-plastic sheets having separate gas flow conduit structures, and securing the sheets together.

Preferably, the heat-exchanger is an opposed-flow heat-exchanger giving improved heat-transfer efficiency.

In one embodiment, some or all of the sheets are panels of parallel, side-by-side thermoplastic tubes.

In one specific embodiment, the tubes in every other sheet are left intact and serve as conduits for one gas, such as outside air, while the other sheets are indented to form separate conduits for another gas, such as exhaust air.

In another specific embodiment, the sheets indented to form gas flow passages are panels made of expanded thermoplastic materials.

In a further specific embodiment, all of the panels have gas flow conduits formed by indenting the sheets.

Preferably, the outside edges of the sheets stacked together are hot-compressed, with a heated roller, e.g. to melt the plastic of the edges to form a relatively thick outer wall which is strong and helps avoid the cost of a metal housing for the heat-exchanger. Flame singeing is used to fuse the ends of gas flow conduits together.

The sheets are secured together, broad-face to broad-face, either with silicone adhesive, or preferably, by heat-singeing at least one broad surface of one of the sheets to make it tacky before another sheet is pressed against the tacky surface to adhere the sheets together.

Vanes are die-formed in some of the gas flow passages to increase turbulence and heat-transfer efficiency.

Die forming can be done with heated or cool dies, depending upon the type of panel being used and its condition—whether hot and soft or cool and hard, for example.

The foregoing and other objects and advantages of the invention will be set forth in or apparent from the following description and drawings.

Figure 1:
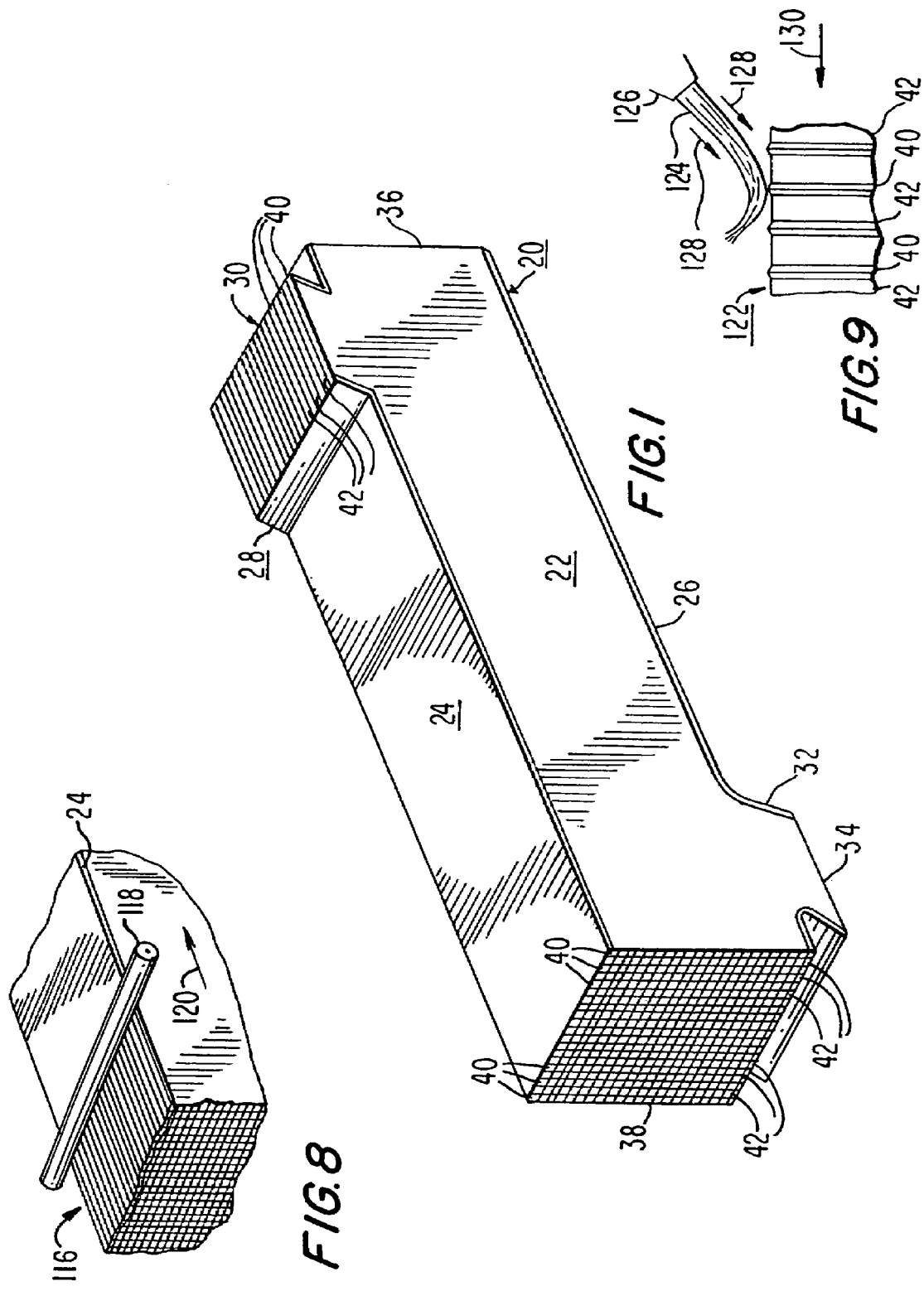
FIG. 1 is a perspective view of a heat-exchanger constructed in accordance with the present invention.
Figure 2:
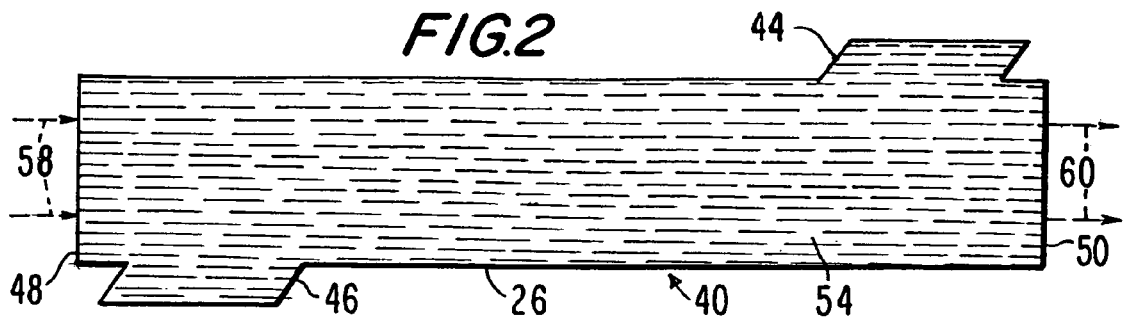
FIGS. 2, 3 and 4 are side-elevation views of sheets or panels used to make the heat-exchanger of FIG. 1.
Figure 3:
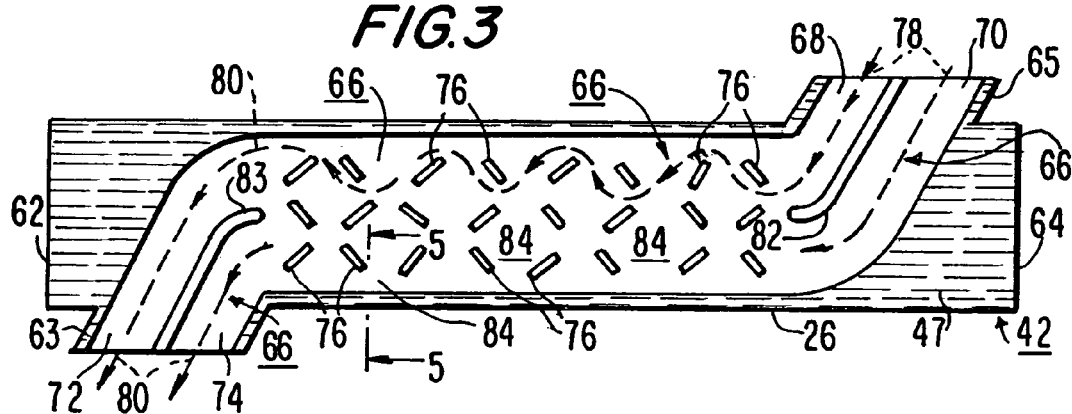
Figure 4:
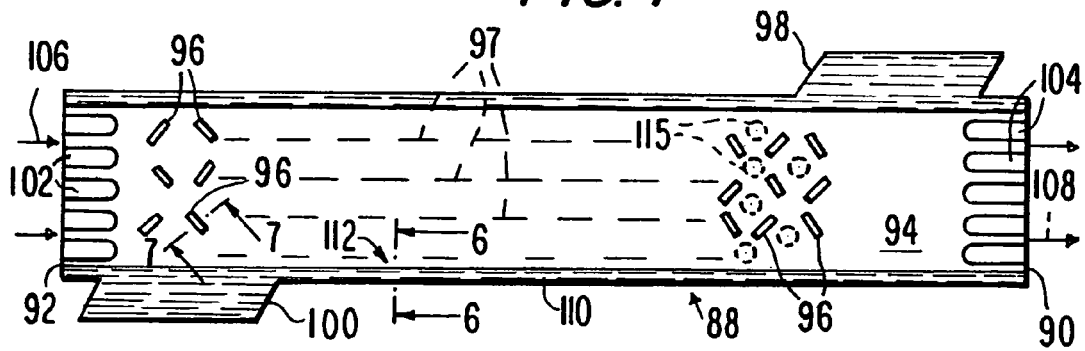
Figure 5:
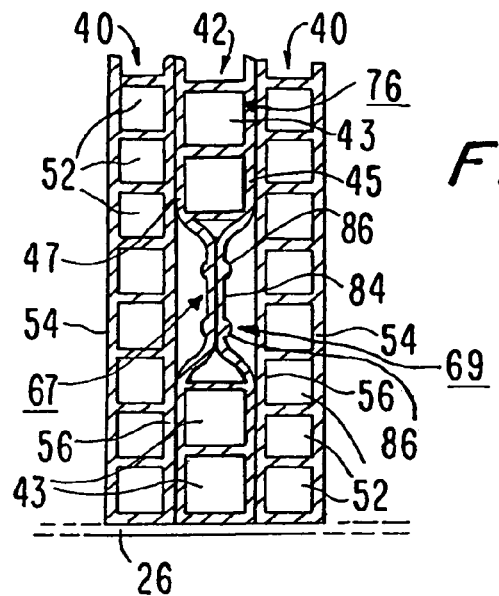
Figure 6:
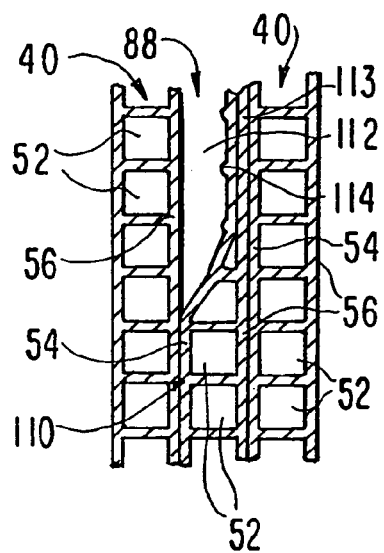
Figure 7:
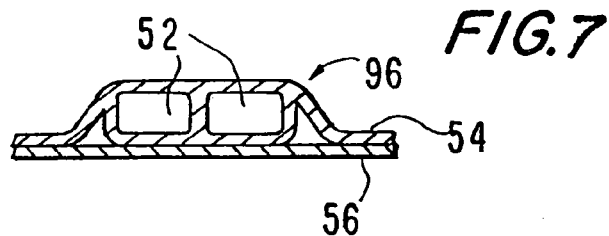
Figure 13:
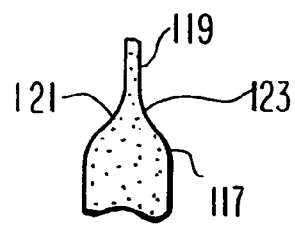

FIGS. 5, 6, and 7 are cross-sectional views, partially broken-away, showing plural adjacent panels of heat-exchangers using the panels of FIGS. 2, 3 and 4, and are taken at the locations indicated by the lines 5-5, 6-6 and 7-7, respectively;

FIGS. 8, 9, 10 and 11 are perspective and cross-sectional partially-schematic views illustrating equipment and steps used in the manufacture of the heat-exchanger of FIG. 1;

FIG. 12 is an elevation view, partially schematic, showing a ventilating system of the present invention; and FIG. 13 is a cross-sectional view of a portion of an alternative panel used in the invention.

HEAT EXCHANGER

FIG. 1 is a perspective view of one embodiment of the heat-exchanger 20 of the present invention.

The heat-exchanger 20 has opposed broad side walls 22, and top and bottom walls 24 and 26.

The heat-exchanger has an upper angular extension 28 defining an upper inlet/outlet 30, and a lower angular extension 32 defining a lower inlet/outlet 34 connected internally to the upper inlet/outlet 30. The inlet/outlets 30 and 34 and the internal passageways (not visible in FIG. 1) interconnecting them form a first gas flow conduit.

A second gas flow conduit is formed by inlet/outlets 36 and 38 at the right and left ends of the heat-exchanger, and internal passageways (not visible in FIG. 1) interconnecting them.

Each of the various inlet/outlets 30, 34, 36 and 38 is capable of being used either as an inlet or outlet for the flow of gases through the heat-exchanger.

As it will be explained in detail below, the two gas flow conduits are constructed to be parallel to one another over a substantial portion of their lengths so as to produce counterflow heat exchange when the gases flow in opposite directions.

Panel Construction

The heat-exchanger 20 is made of a plurality of vertical panels or sheets 40, 42 interleaved with and secured to one another preferably in alternating sequence.

FIG. 2 is a side elevation view of one of the panels 40, and FIG. 3 is a similar view of one of the panels 42.

The panels 40 and 42 are cut to have relatively long, straight parallel upper and lower edges with upper and lower angular extensions 44 and 46, and 63 and 65, respectively. The extensions are of the same size and shape so as to form the extensions 28 and 32 (FIG. 1) when the panels are assembled together.

Preferably, both panels 40 and 42 are made of "sign-board" material, whose construction is shown in cross-section in FIG. 5.

As it is shown in FIG. 5, each panel 40 has relatively thin opposed outside walls 54 and 56 with broad surfaces, and elongated integral tubes 53 of rectangular or square cross-section formed between two walls 54 and 56. The panels are believed to be extruded from a thermoplastic material such as polypropylene, polyethylene or polystyrene. Sign-board material typically is used as relatively lightweight, strong and inexpensive material for making signs or displays.

The structure of each panel 42 is substantially the same as the structure of panel 40, and consists of outside walls 45 and 47 and tubes 43. The panels may be thicker than panels 40, and the tubes 43 larger in cross-sectional area than the tubes 52, so as to facilitate the flow conduit formation process.

As it is shown in FIGS. 3 and 5, the broad surfaces 45 and 47 of each panel 42 are indented in selected areas to form a pair of gas flow cavities 66. Preferably, the indentations are made by means of dies such as the dies 136 and 138 shown in FIG. 11. The dies preferably are heated in order to permanently deform the panel material.

When the panels 40 and 42 and assembled together with broad surfaces contacting one another, as shown in FIG. 5, gas flow passageways or conduits 67 and 69 are formed. Heat is transferred between the gas in conduits 67 and 69 and a single-thickness wall 56 of each adjacent panel 40. This is an advantage over prior heat exchangers in which heat is transferred through multiple wall thicknesses.

As it is shown in FIG. 5, the indentations compress the internal walls of the tubes together to form a two-ply wall 84 in the center of the panel 42, with ribs 86 extending outwardly at the locations of the compressed internal walls.

Preferably, vanes 76 (see FIG. 3) are formed in the gas flow cavities 66 by the provision of cavities in the dies 13 and 138 (FIG. 11), which has the effect of leaving the panel material uncompressed and projecting outwardly from the two-ply wall 84. The vanes 76 are arranged to serve as baffles to ensure the turbulent flow of gas along sinuous paths 80 through the conduits 67 and 69, thus increasing the heat transfer efficiency of the heat-exchanger.

Optional guide and support vanes 82 and 83 (FIG. 3) are formed by the same process as the vanes 76 to divide the inlet section of each cavity 66 into the passageways 72 and 74. The vanes 82 and 83 help to direct the flow of air through the conduits 67 and 69 first horizontally, from right to left, as shown in FIG. 3, and then outwardly and downwardly through the outlet passageways 72 and 74.

The vanes 72, 74, 76, 82 and 83 also help to support the adjacent portions of panels 40 to maintain a constant spacing of the panels from one another over the relatively broad span of the inlet and outlet openings.

An alternative panel construction 88 is shown in FIG. 4.

Panel 88 is an alternative to the panel 40 for conducting the gas flow from one end 38 (FIG. 1) to the opposite end 36.

Panel 88 has one or more indentations 94 with vanes 96, 102 and 104 formed by the same process as the vanes 76. The dashed lines 97 indicate the locations of rows of added vanes 96, which are not shown in FIG. 4 for the sake of simplification of the drawings.

The vanes 102 and 104 are provided in order to support the adjacent panels in the heat-exchanger, and to guide gases into and out of the flow passages of the heat-exchanger.

FIG. 7 shows the cross-sectional shape of one of the vanes 96.

The advantage of the panel 88 over the panel 40 is that the gas flow through the conduits is turbulent, thus further increasing the heat-transfer efficiency of the heat-exchanger.

Although it is preferred that the gas flow cavities in the panels be formed by indenting both broad side walls of the panels to form a central two-ply web 84 as shown in FIG. 5, alternatively, the panels can be indented from only one side to form the gas flow cavity 94.

FIG. 6 is a cross-sectional view taken along line 6-6 of FIG. 4 showing this alternative construction. The panel which is indented has broad side walls 54 and 56 with tubes 52. The panel is heat-compressed to form a gas flow passageway in the area 112, and a two-ply wall 113 with ridges 114 at the locations of the compressed inner walls.

Heat is transferred between the gas in the conduit 112 and that flowing in the tubes 52 of the adjacent panels 40. Although heat is transferred through only one wall thickness in the case of the wall 56, heat must flow through the two-ply wall 113 and wall 54, when being transferred between conduit 112 and the right-hand panel conduits 52 shown in FIG. 6.

This potential reduction in heat transfer efficiency, as compared with the FIG. 5 embodiment, can be acceptable as a compromise to avoid having to make two sets of heat-forming dies or heat-forming both sides of the panels in separate steps using the same dies, if the extra die cost is avoided by using the same dies to form both sides of one panel.

The heat transfer reduction can be minimized by reducing the internal and external wall thickness of the panels 88, and by removing substantial sections of the two-ply wall 113 at many locations (e.g. 115—see FIG. 4), in the panel shaping process.

The panels 40 utilize the tubes 52, which extend the whole length of the panel, as gas flow conduits. However, the panels 42 and 88 do not use the tubes to conduct gas. Instead, the panels are merely used as low-cost thermoplastic sheet material from which to form gas flow conduits. It is possible to use other sheet materials instead for the starting sheets for forming the panels 42 and 88.

For example, it is believed that sheets of expanded thermoplastic materials, such as polypropylene, polyethylene or polystyrene can be used instead of the "sign-board" material. Such sheet materials are widely used as insulating panels in home construction, as flotation materials for floating docks, etc.

FIG. 13 is a broken-away cross-section of a panel of expanded thermoplastic material 117 compressed at 119 to form gas flow cavities 121 and 123. This construction can be easier and less expensive to make than that using sign-board as the starting material for all panels.

Similarly, other compressible and/or heat-formable sheets may be advantageous to use as starting materials. For example, expanded or solid thermo-plastic sheets, still hot after being formed, can be stamped or molded rapidly to provide the desired gas flow cavities without the heating of dies. Some materials may be subject to permanent deformation by the use of cool dies alone. It also is within the scope of the invention to use those materials as alternatives.

Assembly of Panels

The next step in making the heat-exchanger 20 after cutting and forming the panels is to adhere the panels together, with broad surfaces contacting one another, in alternating sequence. That is, for example, a panel 40 forms one side wall 22 of the heat-exchanger, and a panel 42 is secured to it. The next panel is another panel 40, the next is another panel 42, etc. The other side wall 22 of the heat-exchanger would be another panel 40.

The panels are adhered to one another with silicone adhesive, or by use of the process partially illustrated in FIG. 10.

Referring to FIG. 10, several flaming jets 124 are pointed downwardly from burner nozzles 126 fed with fuel (e.g., natural gas) from a manifold 132. The flames are played onto the upper surface of one of the panels 40 while the panel is moved past the flames in the direction 134 at a controlled speed so as to "singe" the upper surface 56 of the panel 40. This slightly melts or softens the upper surface of the panel. Then, the next panel is placed on top of the first panel, either with or without singeing the surface which is to make contact with the first panel, and the panels are pressed together and allowed to cool to cause them to adhere.

This process then is repeated for each subsequent panel added to the stack until a pre-determined number of layers has been formed.

The panels can be held together by many other methods and structures.

For example, metal clamps can be formed out of metal angles and cross rods (not shown) clamping the panels together.

Another assembly method which is believed to be feasible, under some circumstances, is to simply clamp the panels together temporarily until the edges of the panels are fused together, in the manner to be described below, and then removing the clamps, with the fused edges being sufficient to hold the panels together.

Edge Fusing

FIG. 8 shows the preferred method of forming the top and bottom walls 24 and 26.

When the panels are stacked together, the edges are aligned with one another to form straight surfaces. Then, a heated roller 118 is pressed firmly against the upper edges 116 of the panels while the panels are moved as indicated by the arrow 120. This progressively compresses and melts the upper edges of the panels, and the melted plastic is rolled by the roller to form a solid wall of melted plastic.

The panels then are turned over to use the same process to form the opposite wall.

Alternatively, a second heated roller (not shown), spaced vertically from the roller 188 can be used simultaneously to form the top and bottom walls in one pass of the panels through the heated roller mechanism.

Many types of heated rollers can be used, such as ultrasonically-heated rollers or rollers heated with electrical resistance heating.

The edges of the panels at the four inlet/outlets 30, 34, 36 and 38 (FIG. 1) are fused together by flame singeing, as shown in FIG. 9, without closing or significantly reducing the size of the gas inlet/outlet openings.

A flame array like that shown in perspective view in FIG. 12 is used. The array is shown in FIG. 9 in a side elevation view to show the features of each flame 124.

The flame 124 is a jet of burning gas moving downwardly in the direction of the arrows 128. The position and thrust of the jet are adjusted so that just the bottom portion of the flame touches the upper edges 122 of the panel assembly as the assembly is moved past the flame array in the direction of the arrow.

The dwell time of the flames on the panel edges is controlled empirically to limit the melting of the panel end to just enough to fuse the adjacent panel ends together without significantly closing the gas passageways in the panels.

Other means can be used to fuse the ends and edges of the panels together, such as heated rollers and like devices.

The fused top and bottom walls 24 and 26, and the fused edges of the panels at the inlet/outlet locations produce a strong heat-exchanger structure which is capable of supporting itself without a separate housing, thus saving substantial costs for sheet metal and sheet metal fabrication as compared with comparable prior heat-exchangers.

The heat-exchanger 20 is weather-resistant, highly corrosion-resistant, relatively easy to keep clean, and efficient, as well as being relatively economical to make.

Ventilation System

FIG. 12 is a partially-schematic side-elevation view of a ventilation system utilizing the heat-exchanger 20 of the invention to ventilate a building or other conditioned space 160.

As in my patent U.S. Pat. No. 6,176,305, a first fan 144 is positioned at the left inlet end 38 of the heat-exchanger to push outside air ("OSA") through the heat-exchanger and out of the outlet 36 and into the conditioned space 160.

The outside air flows as indicated by the arrows 146 and 148 through an opening 149 in the wall 151 of a building and a fitting 147 secured to the left end of the heat-exchanger, and out through another fitting 153 secured to the right end of the heat-exchanger.

Curved fittings 154 and 156 fit over the angular extensions 28 and 32 of the heat-exchanger.

Mounted inside of outlet fitting 156 is a duct fan 142 which acts as a suction fan to pull exhaust air thorough inlet duct 154 and the heat-exchanger and expel the air through an exhaust outlet 155.

At the exhaust inlet end of the heat-exchanger is a motorized damper 152, a water spray nozzle 150, and a porous mat 158 onto which the spray nozzle 150 sprays water to create evaporative cooling of the exhaust air, when needed.

In accordance with the present invention, either the fiberglass mat 158 or the damper 152, or a combination of both is used to create a restriction to the inflow of exhaust air into the heat-exchanger.

Use of the damper 152 is preferred so as to minimize the restriction caused by the mat 158, especially when evaporative cooling is not required.

The exhaust fan 142 preferably is a centrifugal duct fan which occupies the full width of the duct 156 and is capable of creating a substantial pressure drop. The combination of this suction fan with the flow restriction creates a significant pressure drop in the exhaust air entering the heat-exchanger.

This is believed to significantly increase the evaporation of water and, hence, the evaporative cooling of the exhaust air.

Another advantage of this ventilating system is that it provides resistance to the leakage of exhaust air into the incoming fresh air through any leaks which may exist in the heat-exchanger. This is because the exhaust air in the heat-exchanger is at a lower pressure than the outside air, and any leaks would allow flow from the higher pressure conduits to the low pressure conduits, but not in the opposite direction.

Thus, stale air is not allowed to mix to any significant degree with the fresh air coming into the conditioned space. Although this is highly desirable in any residential or commercial building, it is especially advantageous in hospitals or doctor's offices where it is important to prevent such mixing in order to prevent the spreading of pathogens.

Preferably, the heat-exchanger 20 is mounted with the right end slightly higher than the left so that the body of the heat-exchanger forms an angle θ of around 5 degrees with horizontal. This promotes drainage of condensate and excess water from the evaporative cooling system towards the left end 38.

A gutter 162 is provided in the duct 156 to catch the water draining from the exhaust passageways of the heat-exchanger. The water gathered there flows through a line 168 to an optional waste water recovery facility (not shown) which returns the water for re-use in evaporative cooling, or elsewhere.

A float valve 164 is provided. It closes the drain system until the water level in the tank of the valve 164 reaches a level sufficient to overcome the negative pressure of the fan 142. This prevents the drain from leaking air into the fitting 156 and reducing the effectiveness of the fan.

A similar gutter 166 and drain 170 are provided at the right end of the heat-exchanger, if needed. A similar gutter and drain can be provided at the left end of the heat-exchanger, if needed.

The system shown in FIG. 12 preferably also has suitable control means for controlling the operation of the ventilator in heating, cooling and intermediate cooling modes, as described in my above-identified patent and pending patent application. Louvers, bypass ducts, de-icing means, etc., described there all can be used in the system of FIG. 12, as needed or desired.

The above description of the invention is intended to be illustrative and not limiting. Various changes or modifications in the embodiments described may occur to those skilled in the art. These can be made without departing from the spirit or scope of the invention.

What is claimed is:

1. A heat exchanger comprising, in combination,
a plurality of panels of thermoplastic material, each of said panels having two opposed broad surfaces and two opposed edges, each of said broad surfaces having a greater surface area than either of said edges,
said panels each having a plurality of parallel gas flow conduits, extending in a first direction, and having two ends,
spacers secured between said panels, said spacers forming at least portions of gas flow passageways between said panels,
said spacers and panels together forming a heat exchanging core having two opposed ends and four sides,
a housing enclosing said four sides while leaving said ends open to conduct gas into and out of said flow conduits, said housing comprising first and second pairs of plastic walls, each covering one of said sides and being sealed at its edges to the adjacent walls,
at least one of said second pair of walls comprising melted material of said edges of said panels,
said second pair of walls having a pair of spaced-apart openings, each opening exposing said edges of said panels adjacent but spaced inwardly from one of said ends, and
said walls being selectively extended outwardly from said core to form extending ducts at said openings to convey gas into and out of said gas flow passageways between said panels.

2. A heat exchanger as in claim 1 in which each of the extending ducts extends outwardly away from said core and towards a plane of one of said opposed ends thereof.

3. A heat exchanger as in claim 1 in which said spacers are at least portions of panels shaped to form said passageways.

4. A heat exchanger as in claim 1 in which each of said panels comprises a plurality of elongated tubes secured together to form said panel, and said spacers include members made of thermoplastic material fused together with said panels.

5. A heat exchanger as in claim 1 in which said extending ducts and the ends of said housing are shaped to mate with ductwork fittings for carrying air through said heat exchanger.

6. A heat exchanger as in claim 1 in which said gas flow passageways and gas flow conduits are positioned to conduct gases in substantially opposite directions over a substantial portion of their lengths.

7. A heat exchanger as in claim 1 in which said spacers are positioned and shaped to block flow in said flow passageways through said ends, and form at least one baffle in each of said passageways to deflect gas flow there through.

8. A heat exchanger comprising
(a) a plurality of thermoplastic panels, each having a plurality of parallel conduits joined together side-by-side to form said panel, said panel having a pair of opposed end edges and a pair of opposed side edges, said panels being assembled together with their respective edges being aligned with one another to form a core structure,
(b) a plurality of spacers, each secured between adjacent ones of said panels and forming at least a portion of a gas flow passageway between said adjacent panels, each of said spacers having at least one edge aligned with one of said end edges of one of said panels,
(c) a housing having four solid plastic side walls covering the sides of said core structure, at least some portion of said walls being formed of melted material from the edges of said panels,
(d) said housing sealing the edges of said gas flow passageways between said panels and the edges of said panels except in an inlet and an outlet area for said conduits and an inlet and an outlet area for said gas flow passageways and having walls forming ducts extending away from said core at said inlet and outlet areas for said gas flow passageways.

9. A heat exchanger as in claim 8 in which said ducts are shaped to mate with and be secured to gas flow ductwork fittings, the housing portions covering the sides of said ends of said panels forming two other extensions for mating with ductwork fittings to convey gas through said gas flow conduits.

10. A heat exchanger as in claim 9 in which said housing covers said edges of said panels between adjacent ones of said ducts and isolates the flow of gases through said conduits from the flow through said passageways.

11. A heat exchanger as in claim 10 in which the ends of said conduits at each end of each of said panels are heat-welded to adjacent spacers.

* * * * *